Figure 1:
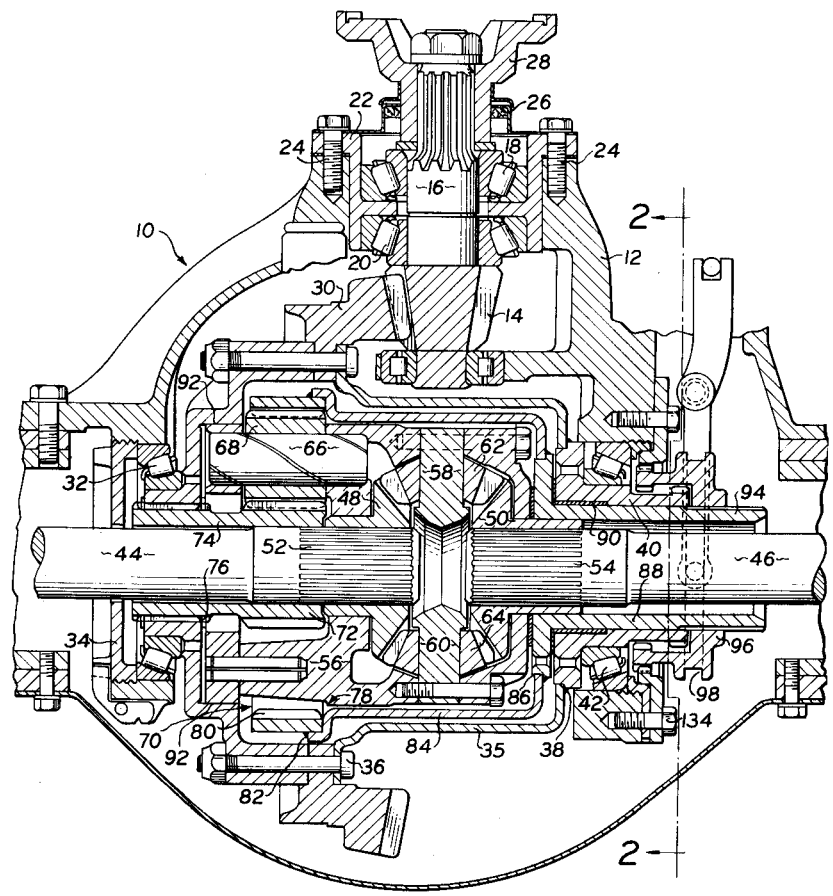

April 21, 1959     R. C. RUSSELL     2,882,752
TWO SPEED AXLE IMPROVEMENT

Filed Aug. 13, 1956     2 Sheets-Sheet 1

INVENTOR.
ROBERT C. RUSSELL
BY
ATTORNEYS

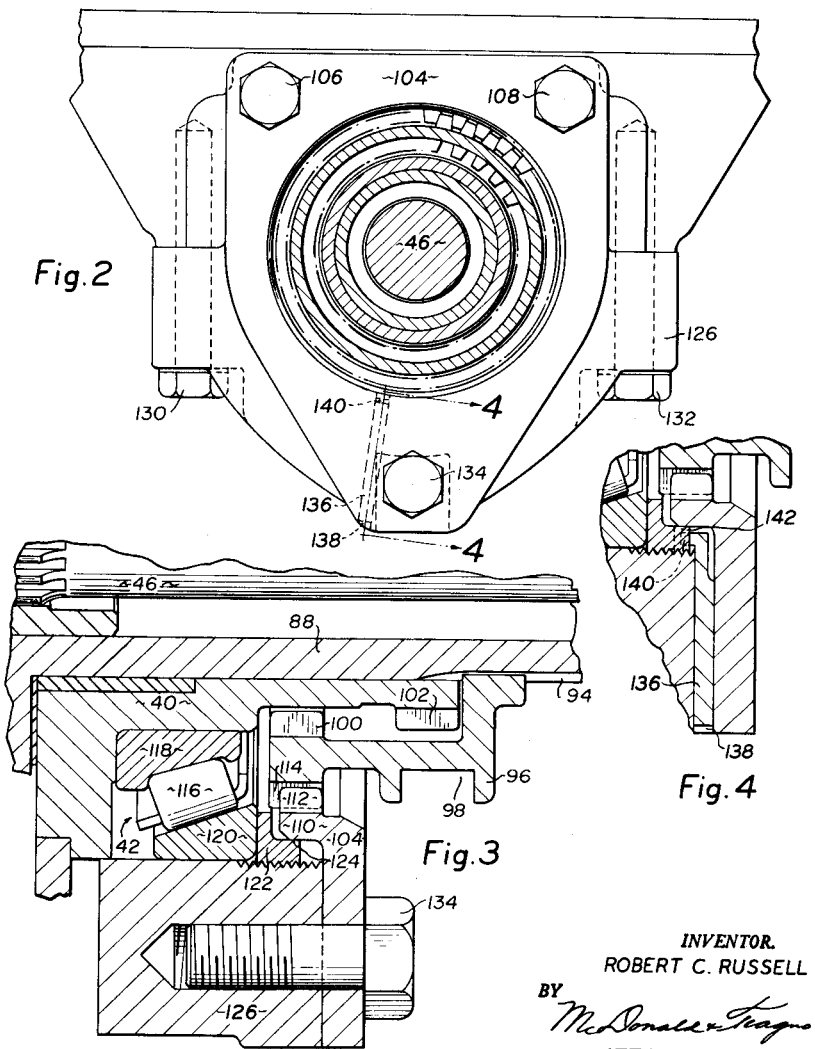

United States Patent Office 2,882,752
Patented Apr. 21, 1959

2,882,752

TWO SPEED AXLE IMPROVEMENT

Robert C. Russell, Shaker Heights, Ohio, assignor to Eaton Manufacturing Company, Cleveland, Ohio, a corporation of Ohio Application August 13, 1956, Serial No. 603,679

10 Claims. (Cl. 74—695)

This invention relates to a power transmission and more particularly to an improvement of a multiple speed ratio axle such as may be employed in trucks, automobiles, and other vehicles.

Broadly, this invention relates to a two-speed ratio axle wherein a ring gear and pinion are driven from the propeller shaft and the ring gear provides an input means to a planetary gear unit which is capable of a reduced speed ratio or lockup speed ratio.

In the past, two-speed axle arrangements have been limited to devices wherein the speed ratio differential was limited; that is, the axle was locked up in one speed ratio and in reduced speed ratio, the axle operated at somewhat less than a ratio of 2 to 1. With such an arrangement, the full capability of a two-speed axle cannot be utilized because such an axle arrangement requires split shifting of the transmission and of the rear axle. Split shifting is defined as an arrangement wherein the axle must be shifted after every shift of the transmission.

To obviate this difficulty, the multiple speed ratio axle disclosed herein has a lockup speed ratio of 1 to 1 and a reduced speed ratio of approximately 3.5 to 1. An axle with such a wide speed ratio range can be utilized with a transmission wherein the transmission is shifted in intermediate steps throughout the transmission range before a shift of the axle is effected. For example, if a four speed transmission is used and the axle is in low speed ratio, the transmission can be shifted from first speed ratio through fourth speed ratio in the low speed ratio of the axle, and then shifted again from first speed ratio through fourth speed ratio in the high speed ratio of the axle. Such an arrangement greatly reduces the number of axle shifts which are necessary during operation of a vehicle, and even more important, enables the use of a transmission which has speed ratios of less magnitude than is required in a transmission which is utilized with an axle of a low speed ratio on the order of 1.5 to 1. With the arrangement disclosed herein, the required torque output of the transmission can be greatly reduced because of torque multiplication which is accomplished by the axle. It is obvious, therefore, that a smaller, lighter, and more compact transmission can be utilized than was heretofore possible.

Certain difficulties, however, are encountered when the axle is relied on to contribute a larger portion of the overall torque multiplication of the power system.

When the axle is operating in reduced speed ratio, the reaction load on the fixed member of the planetary unit is greatly increased as well as the load on the remaining elements of the planetary unit. Applicant's novel structure overcomes these difficulties in a manner which will be hereinafter described.

It is an object of this invention to provide a wide speed ratio range axle wherein the elements of the planetary unit are freely floating with respect to each other, which results in a reduction of wear of the planetary elements.

It is another object of this invention to provide a device wherein the extremely high torque loads are easily accommodated by a structure wherein the shifting mechanism is arranged to handle the extreme loads which are encountered.

These and other objects and advantages will become more apparent from the following detailed description of the device and from the accompanying drawings wherein:

Figure 1 is a cross-sectional view of the two-speed axle.
Figure 2 is a view taken at 2—2 on Figure 1.
Figure 3 is an enlarged view of the details of the clutch shifting mechanism for the axle and
Figure 4 is an enlarged view taken at 4—4 on Figure 2.

Referring to Figure 1 for a detailed description of this device, a multiple speed ratio axle means 10 is comprised of a casing 12 which rotatably supports a pinion 14 having a shaft portion 16 which is supported by bearings 18 and 20 in a bearing carrier 22. The bearing carrier 22 is suitably supported in casing 12 by bolts 24 and a seal 26 is provided adjacent the adapter flange 28 to prevent the leakage of lubricating oil.

The pinion 14 meshes with a bevel ring gear 30 which is supported in the casing 12 by a thrust bearing means 32 and a bearing adjusting means 34 is threadingly engaged with the casing 12 and abuts bearing 32. The bevel ring gear 30 is provided with another supporting means which is spaced from the bearing support 32. This supporting means comprises an annular member 35 suitably attached at 36 to the bevel ring gear 30 and attached at 38 to a member 40 which is rotatably supported in bearing 42.

A pair of axle shafts 44 and 46 are connected to driving wheels of a vehicle (not shown in the drawing) and these axle shafts have attached thereto, a pair of differential gears 48 and 50, respectively, by splines 52 and 54. A differential pinion carrier 56 is provided with a multiplicity of pinion shafts, two of which are shown at 58 and 60 and have rotatably mounted thereon, pinions 62 and 64, respectively, in meshing engagement with differential gears 48 and 50.

The differential pinion carrier 56 also has connected thereto a plurality of pinion shafts 66 upon which are rotatably mounted planet pinions 68 of a planetary gear unit 70. A sun gear 72 is provided with an extended portion 74 and is splined at 76 to the bevel ring gear 30. A ring gear assembly 78 is comprised of a ring gear 80 suitably attached at 82 to an annular member 84 which is attached at 86 to a flanged sleeve 88.

A bronze bushing 90 is provided in an internal annular recessed portion of the inboard end of the member 40 so that friction between the sleeve and the member will be minimized.

A part of this invention relates to the full floating arrangement of the planetary gear unit 70. The carrier 56, which has rotatably mounted thereon differential pinions 62, 64, and planet pinions 66, is a full floating member; that is, the carrier is restrained from laterial and longitudinal movement only by the engagement of the planet pinions with the sun gear and by the engagement of the differential pinions with the differential gears. Clearance is provided between carrier 56 and bevel ring gear assembly 30 at 92 so that the planet pinions 68 are retained in position merely by their engagement with sun gear 72. The extended portion 74 of sun gear 72 is rigidly fixed to the bevel ring gear 30 by the spline 76. Clearance is also provided between member 40 and flanged sleeve 88, between differential gear 50 and the flanged sleeve 88 and between axle shaft 44 and sun gear 72. This arrangement allows the ring gear assembly 78 to have a limited amount of lateral movement with respect to the axle shafts so that the planetary gear unit is truly a floating gear unit and greatly reduces the wear on the planetary gear unit and allows the several elements of the planetary unit to move laterally to a centralized or equalized position whereby the objectionable features of impact forces and high contact loads are minimized.

The arrangement of the shifting mechanism of this device constitutes an important part of the invention. Referring to Figures 1 and 3, the flanged sleeve 88 has splined thereto at 94, an axially shiftable toothed element 96 having an external annular groove 98 therein adapted to receive a suitable shifting mechanism. An internal row of teeth 100 on the element 96 is adapted to be selectively engaged with an external row of teeth 102 formed on sleeve 40 which is drivingly connected to the sun gear 72. A low speed reaction plate 104 is attached by spaced means 106 and 108 to the casing 12. The low speed reaction plate 104 is provided with an offset portion 110 which has formed thereon an internal row of teeth 112 which are adapted to be selectively engaged with an external row of teeth 114 formed on the shiftable element 96. The bearing 42 is provided with thrust rollers 116 and inner race 118 which supports member 40, and an outer race 120 supported in the casing 12. A bearing adjustor 122 is threadingly engaged with the casing 12 and abuts the end surface of outer race 120 of bearing 42. Concentricity is maintained between the surface of the bearing adjustor at 124 and the surface of the sleeve 40 which is contacted by the inner bearing race 118 so that the annular row of teeth 102 will be held concentric with the teeth 112. This construction insures free longitudinal movement of the shiftable element 96 into and out of engagement with the teeth 112, and also insures that when the shiftable element 96 is centralized due to reaction torque, there is adequate clearance between the ends of teeth 114 and the root circle of teeth 112. With this construction, the reaction torque imposed on the low speed reaction plate 104 is taken through the bolt means 106 and 108 and the force exerted is transmitted to bolt means 106 and 108 as a shear force. Maintaining the concentric arrangement of the low speed reaction plate 104 by its fit with the bearing adjustor 122 separates the positioning function from the load taking function of means 106 and 108. Such an arrangement requires no close tolerances between the low speed reaction plate and the force absorbing bolt means 106 and 108 which results in a much simplified structure and one which is capable of absorbing enormous reaction loads. Also, with this arrangement, a full annulus of reaction teeth 112 is provided, as opposed to the conventional structure wherein it is feasible to provide only a short arcuate segment of teeth due to the structural design of the other cooperating elements.

A bearing cap member 126 is fastened to the casing 12 by bolts 130 and 132 which are threaded in the casing and hold the bearing cap in the assembled position.

A body bolt 134 is used to fasten the low speed reaction plate 104 to the bearing cap 126. With this arrangement, the body bolts 106, 108, and 134 absorb the reaction torque which is transmitted to the low speed reaction plate 104 from the ring gear 80. The bolt 134 also functions to prevent the low speed reaction plate from flexing away from the bearing cap 126.

Figure 4 illustrates the details of a locking means for the bearing adjustor 122 wherein a key 136 is arranged in a slot 138 in the bearing cap 126 and is provided with a locking portion 140 which is receivable in one of a plurality of recessed portions 142 of the bearing adjustor 122 to lock the bearing adjustor in a selected, adjusted position. To adjust the load on the bearing, the low speed reaction plate is removed and locking portion 140 of key 136 is moved to a spaced position from recess 142 and the bearing adjustor is moved to the desired position. The key 136 is reinserted in the appropriate recess 142 and the low speed reaction plate is replaced and tightened.

While the present invention has been described in connection with certain specific embodiments, it is to be understood that the foregoing description is merely exemplary and that the concept of this invention is susceptible of numerous other modifications, variations, and applications which will be apparent to persons skilled in the art. The invention is to be limited, therefore, only by the broad scope of the appended claims.

What I claim is:

1. A multiple speed ratio axle means comprising a supporting housing, an axle input pinion, a pair of axle shafts, a bevel ring gear assembly in meshing engagement with said pinion and supported by said housing, separate differential gears fixedly mounted on each of said axle shafts, a carrier assembly, differential pinion gears rotatably mounted on said carrier assembly and in meshing engagement with said differential gears, spaced planet pinions rotatably mounted on said carrier assembly, a sun gear fixed to said bevel ring gear assembly and in meshing engagement with said planet pinions, a ring gear assembly in meshing engagement with said planet pinions and a portion of said ring gear assembly being supported by a portion of said bevel ring gear assembly at a position axially remote from said meshing engagement of said gun gear and said planet pinions in a manner to allow lateral movement of said ring gear assembly, said carrier being supported only by said meshing engagement of said differential pinions with said differential gears and said planet pinions with said sun gear whereby said ring gear assembly and said carrier assembly are floating assemblies.

2. A multiple speed ratio axle means comprising a supporting housing having spaced bearing means therein, an axle input pinion supported in said housing, a bevel ring gear assembly in meshing engagement with said pinion and being supported by said spaced bearing means, a planetary gear unit having a sun gear fixed to and supported by said bevel ring gear assembly, a carrier member having planet pinions rotatably mounted thereon and in meshing engagement with said sun gear, a ring gear assembly having a ring gear in meshing engagement with said planet pinions and a portion of said ring gear assembly remote from said ring gear being loosely supported by a portion of said bevel ring gear assembly, a pair of spaced axle shafts concentric with said planetary gear unit, each of said axle shafts having a differential gear fixed thereto, differential pinions rotatably mounted on said carrier member and in meshing engagement with said differential gears, said carrier member being supported solely by said meshing engagement of said planet pinions with said sun gear and of said differential pinions with said differential gears, whereby said carrier assembly and said ring gear assembly are full floating assemblies.

3. A device according to claim 2, wherein said bevel ring gear assembly has a portion located outside said spaced bearing means, said portion having a row of external clutch teeth thereon, said ring gear assembly having a portion extending outside said spaced bearing means and located radially inward of said last mentioned portion of said bevel ring gear assembly, a slideable clutch member drivingly connected to said last mentioned portion of said ring gear assembly and having a row of internal clutch teeth and a row of external clutch teeth located thereon, a low speed reaction plate member connected to said housing and having a row of internal clutch teeth thereon, said external teeth on said slideable clutch member having a diameter greater than the inside diameter of said spaced bearing means.

4. A device according to claim 2 wherein said bevel ring gear assembly comprises a sleeve member attached to said bevel ring gear, a flanged sleeve portion rotatably mounted in one of said spaced bearing means and connected to said sleeve member, said one spaced bearing means being provided with a bearing adjustor ring threadingly connected with said housing and remote from said other spaced bearing means, a low speed reaction plate adjacent said bearing adjustor ring and being fixedly attached to said housing, said low speed reaction plate having a row of internal teeth thereon, a slidable member having a row of external teeth thereon, said slideable member being drivingly engaged with said ring gear assembly and movable axially relative thereto and said teeth on said low speed reaction plate and said teeth on said slideable member being selectively engageable whereby said reaction torque from said ring gear assembly is transmitted to said housing.

5. A multiple speed ratio axle means comprising a housing, an input pinion, a bevel ring gear assembly comprising a bevel ring gear meshing with said input pinion and having portions supported by spaced bearing means in said housing, a planetary gear unit having a sun gear fixed to and supported by said bevel ring gear assembly, a carrier member, a ring gear assembly, a pair of floating axle shafts, differential means drivingly connecting said carrier member with said axle shafts, said ring gear assembly and said carrier assembly being floatingly supported by said sun gear and said differential means so that said carrier assembly and said ring gear assembly have limited lateral movement with respect to said axle shafts.

6. In a multiple speed ratio axle means, a housing, spaced bearing means in said housing, a planetary gear unit having a sun gear, a ring gear and a carrier member having planet pinions rotatably mounted thereon, shifting means to selectively fix said ring gear from rotation or to drivingly connect said ring gear and said sun gear for conjoint rotation, said shifting means comprising a row of clutch teeth drivingly connected to said sun gear and a shiftable member having internal and external clutch teeth and being drivingly connected to said ring gear and axially movable relative thereto, said clutch teeth drivingly connected to said sun gear being selectively engageable with said internal clutch teeth, a bearing adjustor ring for adjusting one of said spaced bearing means and being threadedly connected to said housing, a low speed reaction plate adjacent said bearing adjustor ring and having a full annulus of internal clutch teeth thereon of a greater diameter than the inside diameter of said bearing disposed adjacent said bearing adjustor ring and said external clutch teeth on said shiftable member being selectively engageable with said internal clutch teeth on said low speed reaction plate.

7. A device according to claim 6, wherein said low speed reaction plate is attached to said housing by bolt means arranged so that the reaction torque from said ring gear is transmitted to said bolts as a shear force on said bolts.

8. A device according to claim 6, wherein said bearing adjustor ring is locked in position by a key means having a projecting portion selectively receivable in one of several circumferentially spaced slots in said bearing adjustor ring and said key means is carried by a bearing cap means which is fixed to said housing and said low speed reaction plate.

9. A multiple speed ratio axle means comprising a supporting housing having spaced bearing means therein, an axle input pinion rotatably supported in said housing, a bevel ring gear assembly comprising a bevel ring gear in meshing engagement with said pinion, a flanged sleeve portion remote from said bevel ring gear and rotatably mounted in one of said spaced bearing means, an elongated member connected to said flanged sleeve portion and said bevel ring gear, an axial extension of said bevel ring gear rotatably mounted in the other of said spaced bearing means, a planetary gear unit having a sun gear fixed to and supported by said bevel ring gear assembly, a carrier member having planet pinions rotatably mounted thereon and in meshing engagement with said sun gear, a ring gear assembly comprising a ring gear in meshing engagement with said planet pinions, a flanged sleeve portion axially remote from said ring gear and an elongated member connected to said ring gear and said flanged sleeve member, said flanged sleeve portion of said ring gear assembly being rotatable with respect to and laterally movable with respect to said flanged sleeve portion of said bevel ring gear assembly, a pair of spaced axle shafts concentric with said planetary gear unit, each of said axle shafts having a differential gear fixed thereto, differential pinions rotatably mounted on said carrier member and in meshing engagement with said differential gears, said carrier member being supported solely by said meshing engagement of said planet pinions with said sun gear and of said differential pinions with said differential gears whereby said carrier assembly and said ring gear assembly are full floating assemblies.

10. A multiple speed ratio axle means comprising a supporting housing, an axle input pinion, a pair of axle shafts, a bevel ring gear assembly in meshing engagement with said pinion and supported by said housing, separate differential gears separately mounted on each of said axle shafts, a carrier assembly, differential pinion gears rotatably mounted on said carrier assembly and in meshing engagement with said differential gears a planetary gear unit comprising spaced planet pinions rotatably mounted on said carrier assembly, a sun gear fixed to and supported by said bevel ring gear assembly and in meshing engagement with said planet pinions, a ring gear assembly in meshing engagement with said planet pinions, and an intermediate portion of said ring gear assembly being slightly laterally flexible and connecting a portion of said ring gear assembly remote from said ring gear with said ring gear, said portion of said ring gear assembly remote from said ring gear being supported by a portion of said bevel ring gear assembly in a manner to allow lateral movement of said ring gear assembly, said carrier being supported by said meshing engagement of said differential pinions with said differential gears and said planet pinions with said sun gear whereby said ring gear assembly and said carrier assembly are floating assemblies.

References Cited in the file of this patent

UNITED STATES PATENTS

| 1,706,551 | Starr | Mar. 26, 1929 |

FOREIGN PATENTS

| 150,868 | Great Britain | Sept. 16, 1920 |